(12) United States Patent
Sim-Tang

(10) Patent No.: US 7,519,870 B1
(45) Date of Patent: Apr. 14, 2009

(54) METHOD AND SYSTEM FOR NO DOWNTIME, INITIAL DATA UPLOAD FOR REAL-TIME, CONTINUOUS DATA PROTECTION

(75) Inventor: Siew Yong Sim-Tang, Saratoga, CA (US)

(73) Assignee: Asempra Technologies, Inc., Santa Clara, CA (US)

( * ) Notice: Subject to any disclaimer, the term of this patent is extended or adjusted under 35 U.S.C. 154(b) by 833 days.

(21) Appl. No.: 10/863,117

(22) Filed: Jun. 8, 2004

(51) Int. Cl.
*G06F 11/00* (2006.01)
(52) U.S. Cl. ........................................ 714/48; 719/318
(58) Field of Classification Search .................. 714/48, 714/49, 4, 18; 719/318, 314; 709/223; 707/200
See application file for complete search history.

(56) References Cited

U.S. PATENT DOCUMENTS

| | | | |
|---|---|---|---|
| 5,729,743 A | 3/1998 | Squibb | |
| 5,893,119 A | 4/1999 | Squibb | |
| 5,958,010 A * | 9/1999 | Agarwal et al. | 709/224 |
| 6,189,016 B1 * | 2/2001 | Cabrera et al. | 707/203 |
| 6,366,988 B1 | 4/2002 | Skiba et al. | |
| 6,389,427 B1 * | 5/2002 | Faulkner | 707/104.1 |
| 6,460,055 B1 | 10/2002 | Midgley et al. | |
| 6,463,565 B1 | 10/2002 | Kelly et al. | |
| 6,487,561 B1 | 11/2002 | Ofek et al. | |
| 6,526,418 B1 | 2/2003 | Midgley et al. | |
| 6,625,623 B1 | 9/2003 | Midgley et al. | |
| 6,751,753 B2 | 6/2004 | Nguyen et al. | |
| 6,779,003 B1 | 8/2004 | Midgley et al. | |
| 6,816,872 B1 | 11/2004 | Squibb | |
| 6,826,711 B2 | 11/2004 | Moulton et al. | |
| 6,847,984 B1 | 1/2005 | Midgley et al. | |
| 6,993,706 B2 | 1/2006 | Cook | |
| 7,039,663 B1 * | 5/2006 | Federwisch et al. | 707/205 |
| 7,096,392 B2 * | 8/2006 | Sim-Tang | 714/48 |

* cited by examiner

*Primary Examiner*—Dieu-Minh Le
(74) *Attorney, Agent, or Firm*—David H. Judson

(57) ABSTRACT

A data management system or "DMS" provides an automated, continuous, real-time, substantially no downtime data protection service to one or more data sources associated with a set of application host servers. To facilitate the data protection service, a host driver embedded in an application server captures real-time data transactions, preferably in the form of an event journal that is provided to other DMS components. The driver functions to translate traditional file/database/block I/O and the like into a continuous, application-aware, output data stream. The host driver includes an event processor. When a data protection command for a given data source is forwarded to a host driver, the event processor enters into an initial upload state. During this state, the event processor gathers a list of data items of the data source to be protected and creates a data list. Then, the event processor moves the data (as an upload, preferably one data element at a time) to a DMS core to create initial baseline data. In an illustrative embodiment, the upload is a stream of granular application-aware data chunks that are attached to upload events. Simultaneously, while the baseline is uploading and as the application updates the data on the host, checkpoint granular data, metadata, and data events are continuously streamed into the DMS core. During this upload phase, the application does not have to be shutdown.

15 Claims, 13 Drawing Sheets

METHOD AND SYSTEM FOR NO DOWNTIME, INITIAL DATA UPLOAD FOR REAL-TIME, CONTINUOUS DATA PROTECTION

CROSS-REFERENCE TO RELATED APPLICATIONS

This application is related to commonly-owned applications:

Ser. No. 10/842,286, filed May 10, 2004, and titled "METHOD AND SYSTEM FOR REAL-TIME EVENT JOURNALING TO PROVIDE ENTERPRISE DATA SERVICES."

Ser. No. 10/841,398, filed May 7, 2004, now U.S. Pat. No. 7,096,392, and titled "METHOD AND SYSTEM FOR AUTOMATED, NO DOWNTIME, REAL-TIME, CONTINUOUS DATA PROTECTION."

BACKGROUND OF THE INVENTION

1. Technical Field

The present invention relates generally to enterprise data protection.

2. Background of the Related Art

A critical information technology (IT) problem is how to cost-effectively deliver network wide data protection and rapid data recovery. In 2002, for example, companies spent an estimated $50B worldwide managing data backup/restore and an estimated $30B in system downtime costs. The "code red" virus alone cost an estimated $2.8B in downtime, data loss, and recovery. The reason for these staggering costs is simple—traditional schedule based tape and in-storage data protection and recovery approaches can no longer keep pace with rapid data growth, geographically distributed operations, and the real time requirements of 24×7×265 enterprise data centers.

Traditionally, system managers have use tape backup devices to store system data on a periodic basis. For example, the backup device may acquire a "snapshot" of the contents of an entire hard disk at a particular time and then store this for later use, e.g., reintroduction onto the disk (or onto a new disk) should the computer fail. The problems with the snapshot approaches are well known and appreciated. First, critical data can change as the snapshot is taken, which results in incomplete updates (e.g., half a transaction) being captured so that, when reintroduced, the data is not fully consistent. Second, changes in data occurring after a snapshot is taken are always at risk. Third, as storage device size grows, the bandwidth required to repeatedly offload and store the complete snapshot can become impractical. Most importantly, storage based snapshot does not capture fine grain application data and, therefore, it cannot recover fine grain application data objects without reintroducing (i.e. recovering) the entire backup volume to a new application computer server to extract the fine grain data object.

Data recovery on a conventional data protection system is a tedious and time consuming operation. It involves first shutting down a host server, and then selecting a version of the data history. That selected version of the data history must then be copied back to the host server, and then the host server must be re-started. All of these steps are manually driven. After a period of time, the conventional data protection system must then perform a backup on the changed data. As these separate and distinct processes and systems are carried out, there are significant periods of application downtime. Stated another way, with the current state of the art, the processes of initial data upload, scheduled or continuous backup, data resynchronization, and data recovery, are separate and distinct, include many manual steps, and involve different and uncoordinated systems, processes and operations.

BRIEF SUMMARY OF THE INVENTION

A data management system or "DMS" provides an automated, continuous, real-time, substantially no downtime data protection service to one or more data sources associated with a set of application host servers. The data management system typically comprises one or more regions, with each region having one or more clusters. A given cluster has one or more nodes that share storage. To facilitate the data protection service, a host driver embedded in an application server captures real-time data transactions, preferably in the form of an event journal that is provided to a DMS cluster. The driver functions to translate traditional file/database/block I/O and the like into a continuous, application-aware, output data stream. According to the invention, the host driver includes an event processor that provides the data protection service. In particular, the data protection is provided to a given data source in the host server by taking advantage of the continuous, real-time data that the host driver is capturing and providing to other DMS components.

When a given data protection command for a given data source is forwarded to a host driver, the event processor enters into an initial upload state. During this state, the event processor gathers a list of data items of the data source to be protected and creates a data list. The data list is sometimes referred to as a sorted source tree. Then, the event processor moves the data (as an upload, preferably one data element at a time) to a DMS core to create initial baseline data. In an illustrative embodiment, the upload is a stream of granular application-aware data chunks that are attached to upload events. During this upload phase, the application does not have to be shutdown. Simultaneously, while the baseline is uploading and as the application updates the data on the host, checkpoint granular data, metadata, and data events are continuously streamed into the DMS core, in real-time. Preferably, the update events for the data that are not already uploaded are dropped so that only the update events for data already uploaded are streamed to the DMS. The DMS core receives the real time event journal stream that includes the baseline upload events and the change events. It processes these events and organizes the data to maintain their history in a persistent storage of the DMS. If DMS fails while processing an upload or an update data event, preferably a failure event is forwarded back to the host driver and entered into an event queue as a protocol specific event. The event processor then marks the target item associated with the failure "dirty" (or out-of-sync) and then performs data synchronization with the DMS on that target item.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN
ILLUSTRATIVE EMBODIMENT

Figure 1:
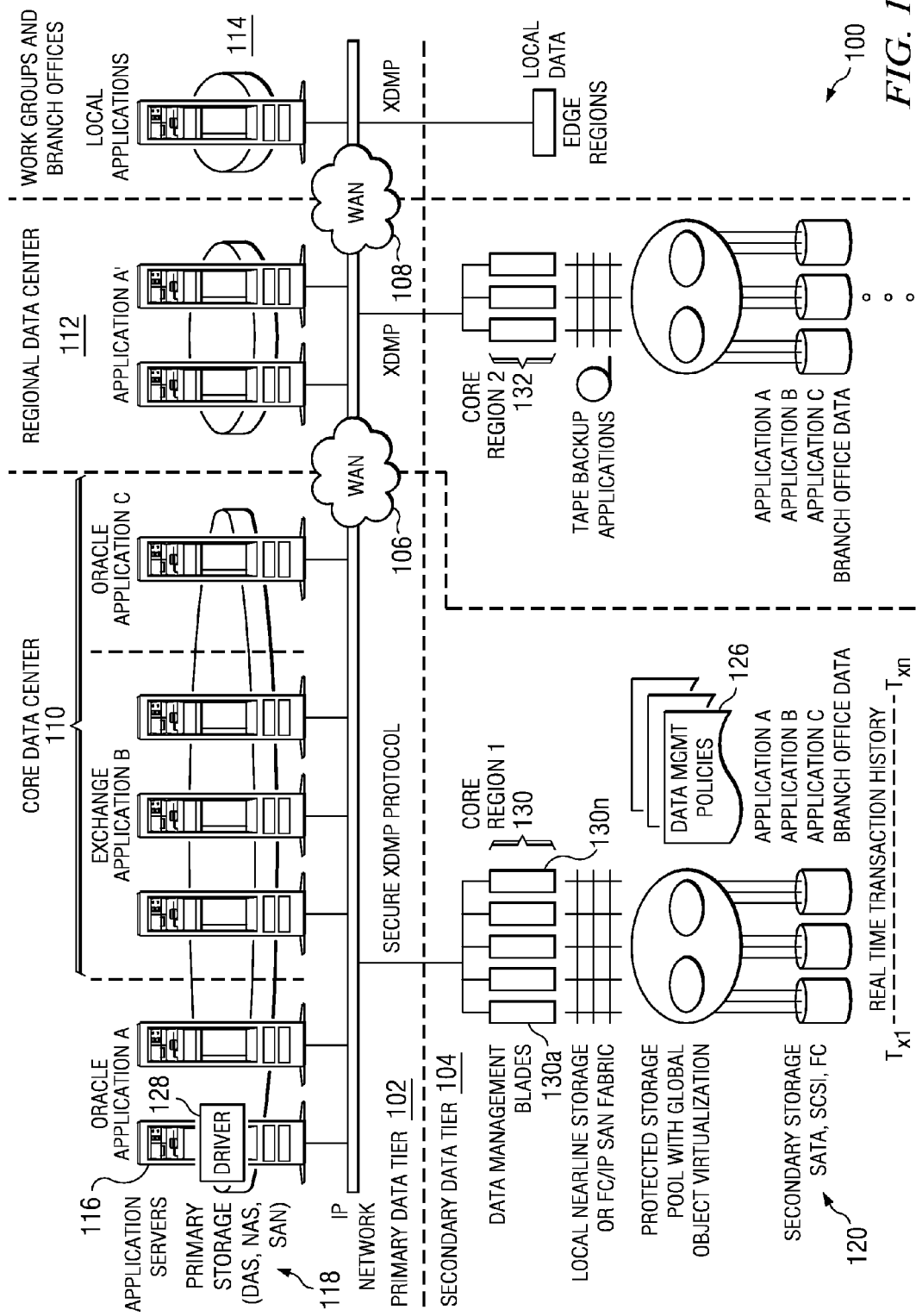
FIG. 1 is an illustrative enterprise network in which the present invention may be deployed.

FIG. 1 illustrates a representative enterprise 100 in which the present invention may be implemented. This architecture is meant to be taken by way of illustration and not to limit the applicability of the present invention. In this illustrative example, the enterprise 100 comprises a primary data tier 102 and a secondary data tier 104 distributed over IP-based wide area networks 106 and 108. Wide area network 106 interconnects two primary data centers 110 and 112, and wide area network 108 interconnects a regional or satellite office 114 to the rest of the enterprise. The primary data tier 102 comprises application servers 116 running various applications such as databases, email servers, file servers, and the like, together with associated primary storage 118 (e.g., direct attached storage (DAS), network attached storage (NAS), storage area network (SAN)). The secondary data tier 104 typically comprises one or more data management server nodes, and secondary storage 120, which may be DAS, NAS, and SAN. The secondary storage may be serial ATA interconnection through SCSI, Fibre Channel (FC or the like), or iSCSI. The data management server nodes create a logical layer that offers object virtualization and protected data storage. The secondary data tier is interconnected to the primary data tier, preferably through one or more host drivers (as described below) to provide real-time data services. Preferably, and as described below, the real-time data services are provided through a given I/O protocol for data transfer. Data management policies 126 are implemented across the secondary storage in a well-known manner. A similar architecture is provided in data center 112. In this example, the regional office 114 does not have its own secondary storage, but relies instead on the facilities in the primary data centers.

As illustrated, a "host driver" 128 is associated with one or more of the application(s) running in the application servers 116 to transparently and efficiently capture the real-time, continuous history of all (or substantially all) transactions and changes to data associated with such application(s) across the enterprise network. As will be described below, the present invention facilitates real-time, so-called "application aware" protection, with substantially no data loss, to provide continuous data protection and other data services including, without limitation, data distribution, data replication, data copy, data access, and the like. In operation, a given host driver 128 intercepts data events between an application and its primary data storage, and it may also receive data and application events directly from the application and database. In a representative embodiment, the host driver 128 is embedded in the host application server 116 where the application resides; alternatively, the host driver is embedded in the network on the application data path. By intercepting data through the application, fine grain (but opaque) data is captured to facilitate the data service(s). To this end, and as also illustrated in FIG. 1, each of the primary data centers includes a set of one or more data management servers 130a-n that cooperate with the host drivers 128 to facilitate the data services. In this illustrative example, the data center 110 supports a first core region 130, and the data center 112 supports a second core region 132. A given data management server 130 is implemented using commodity hardware and software (e.g., an Intel processor-based blade server running Linux operating system, or the like) and having associated disk storage and memory. Generalizing, the host drivers 128 and data management servers 130 comprise a data management system (DMS) that provides potentially global data services across the enterprise.

Figure 2:
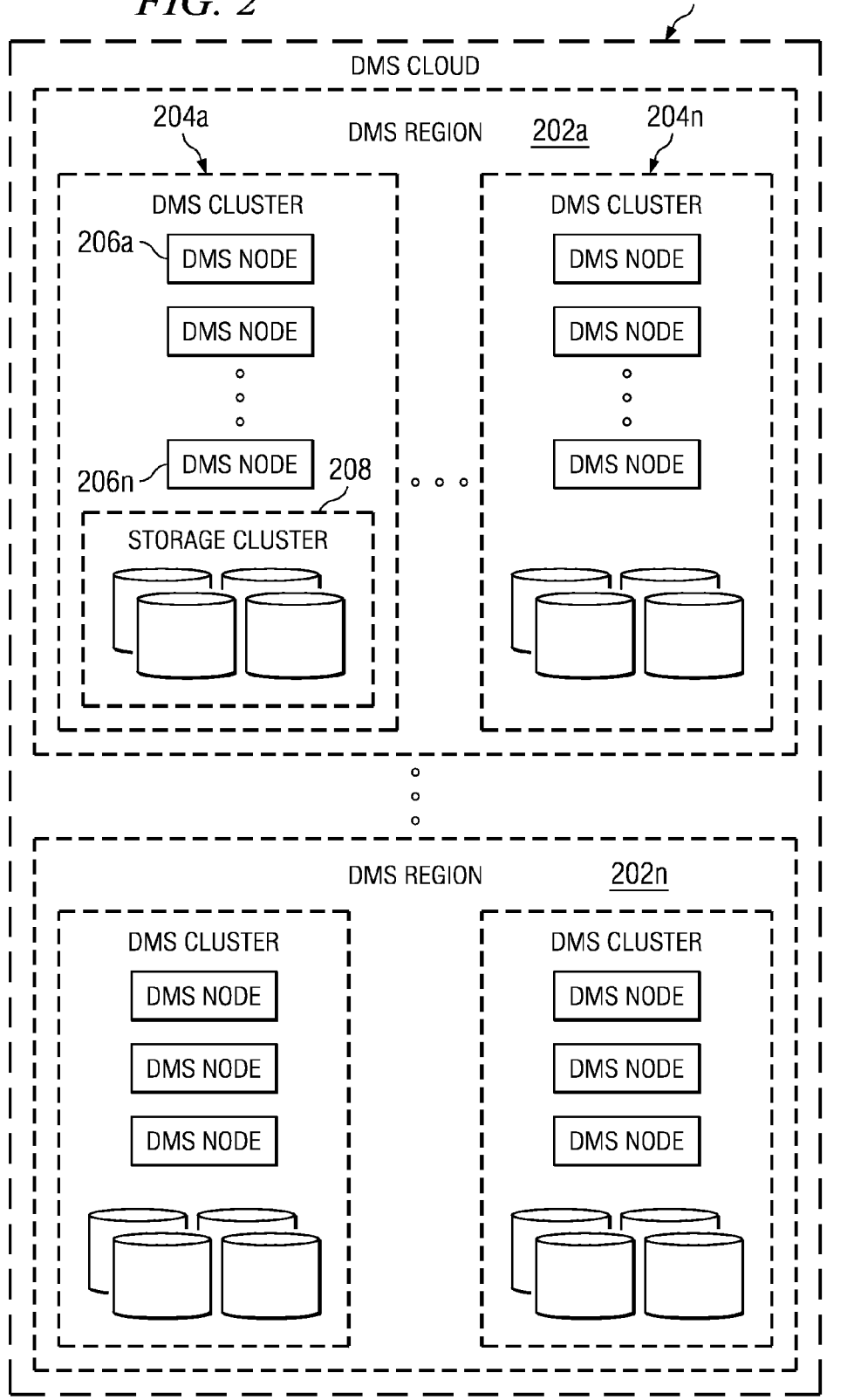
FIG. 2 is an illustration of a general data management system (DMS) of the present invention.

FIG. 2 illustrates a preferred hierarchical structure of a data management system 200. As illustrated, the data management system 200 comprises one or more regions 202a-n, with each region 202 comprising one or more clusters 204a-n. A given cluster 204 includes one or more nodes 206a-n and a shared storage 208 shared by the nodes 206 within the cluster 204. A given node 206 is a data management server as described above with respect to FIG. 1. Within a DMS cluster 204, preferably all the nodes 206 perform parallel access to the data in the shared storage 208. Preferably, the nodes 206 are hot swappable to enable new nodes to be added and existing nodes to be removed without causing cluster downtime. Preferably, a cluster is a tightly-coupled, share everything grouping of nodes. At a higher level, the DMS is a loosely-coupled share nothing grouping of DMS clusters. Preferably, all DMS clusters have shared knowledge of the entire network, and all clusters preferably share partial or summary information about the data that they possess. Network connections (e.g., sessions) to one DMS node in a DMS cluster may be re-directed to another DMS node in another cluster when data is not present in the first DMS cluster but may be present in the second DMS cluster. Also, new DMS clusters may be added to the DMS cloud without interfering with the operation of the existing DMS clusters. When a DMS cluster fails, its data may be accessed in another cluster transparently, and its data service responsibility may be passed on to another DMS cluster.

Figure 3:
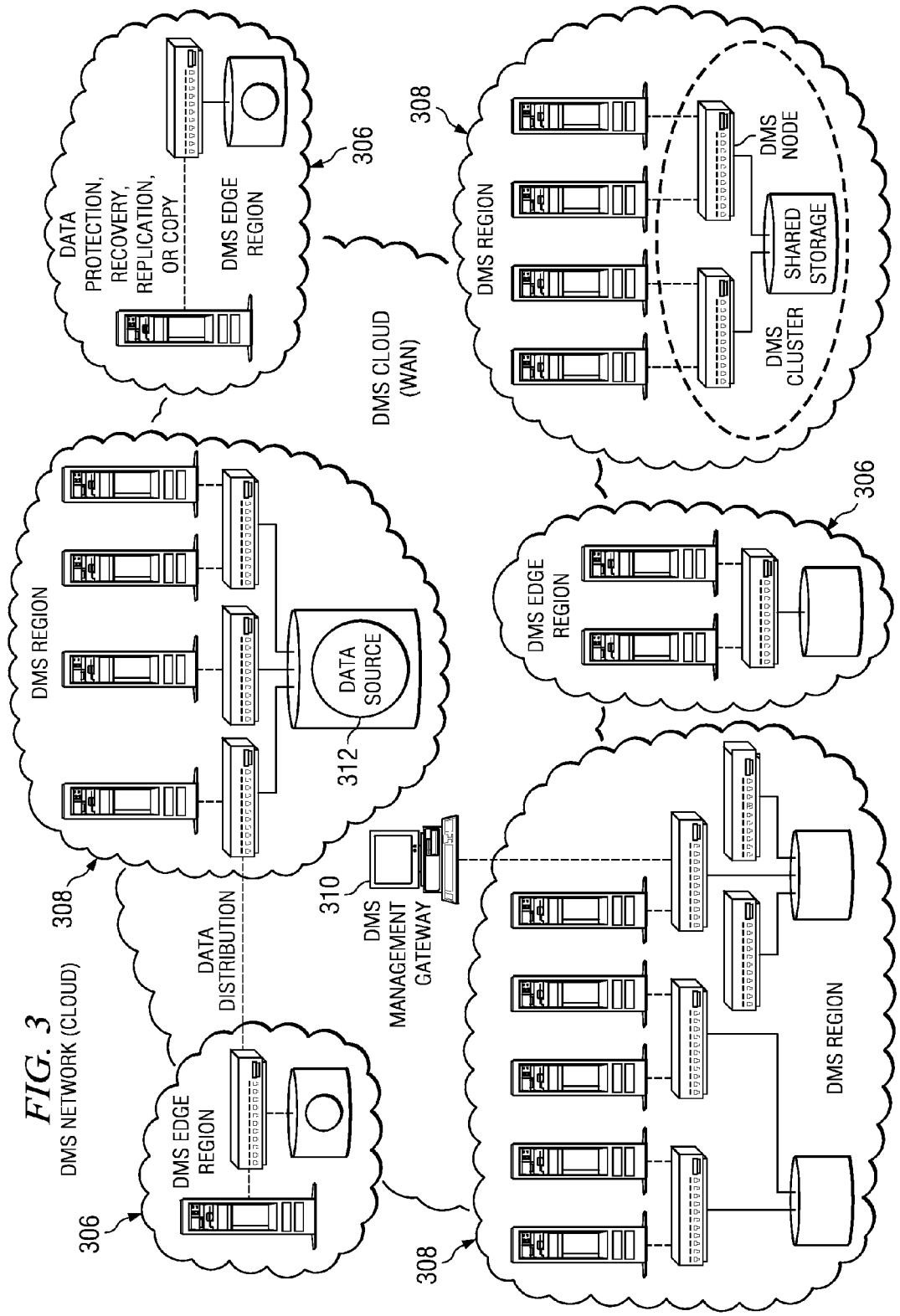
FIG. 3 is an illustration of a representative DMS network according to one embodiment of the present invention.

FIG. 3 illustrates the data management system (DMS) as a network (in effect, a wide area network "cloud") of peer-to-peer DMS service nodes. As discussed above with respect to FIG. 2, the DMS cloud 300 typically comprises one or more DMS regions, with each region comprising one or more DMS "clusters." In the illustrative embodiment of FIG. 3, typically there are two different types of DMS regions, in this example an "edge" region 306 and a "core" region 308. This nomenclature is not to be taken to limit the invention, of course. As illustrated in FIG. 1, an edge region 306 typically is a smaller office or data center where the amount of data hosted is limited and/or where a single node DMS cluster is sufficient to provide necessary data services. Typically, core regions 308 are medium or large size data centers where one or more multi-node clusters are required or desired to provide the necessary data services. The DMS preferably also includes one or more management gateways 310 for controlling the system. As seen in FIG. 3, conceptually the DMS can be visualized as a set of data sources 312. A data source is a representation of a related group of fine grain data. For example, a data source may be a directory of files and subdirectory, or it may be a database, or a combination of both. A data source 312 inside a DMS cluster captures a range of history and continuous changes of, for example, an external data source in a host server. A data source may reside in one cluster, and it may replicate to other clusters or regions based on subscription rules. If a data source exists in the storage of a DMS cluster, preferably it can be accessed through any one of the DMS nodes in that cluster. If a data source does not exist in a DMS cluster, then the requesting session may be redirected to another DMS cluster that has the data; alternatively, the current DMS cluster may perform an on-demand replication to bring in the data.

Figure 4:
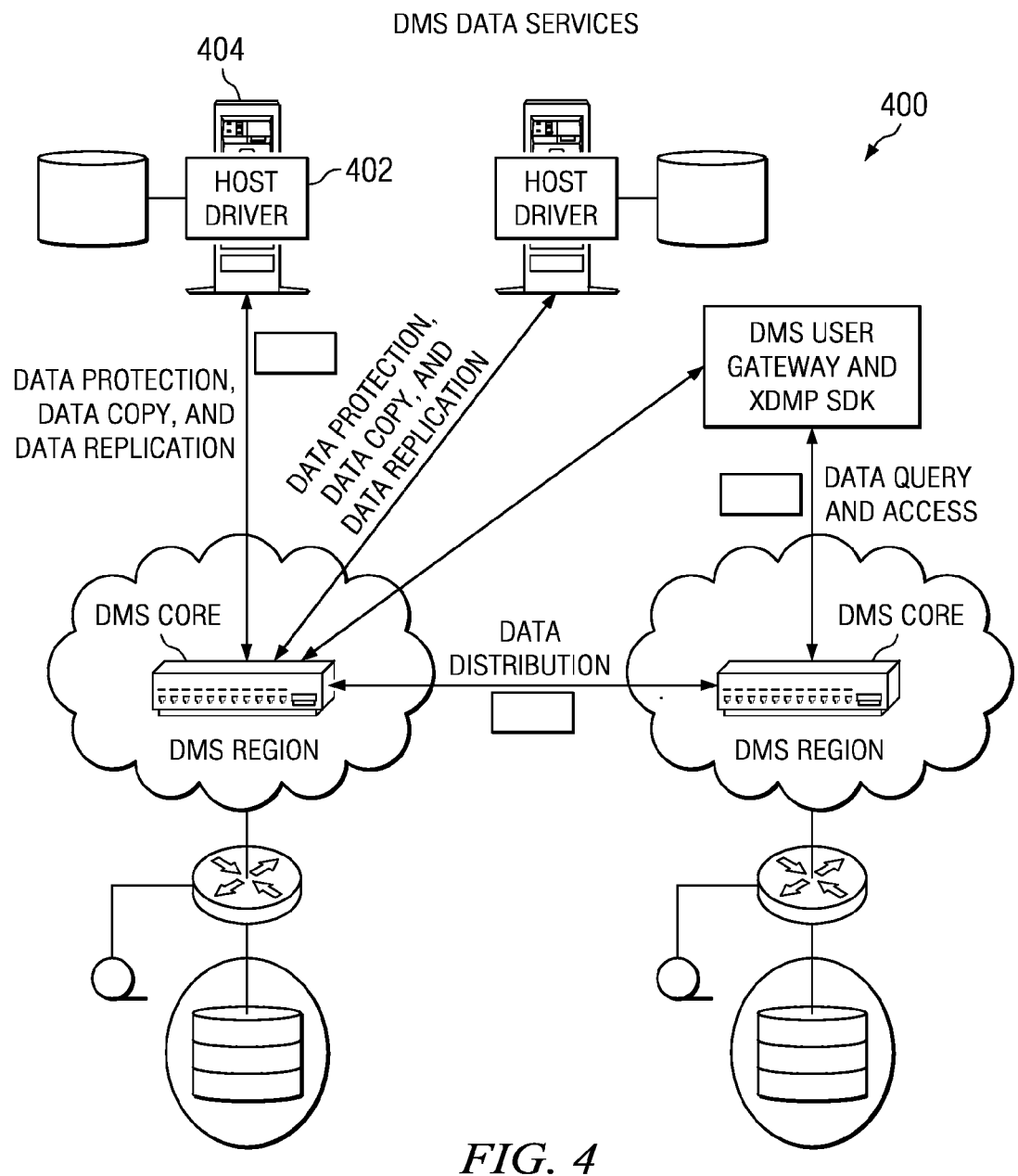
FIG. 4 illustrates how a data management system may be used to provide one or more data services according to the present invention.

Referring now to FIG. 4, an illustrative DMS network 400 provides a wide range of data services to data sources associated with a set of application host servers. As noted above, and as will be described in more detail below, the DMS host driver 402 embedded in an application server 404 connects the application and its data to the DMS cluster. In this manner, the DMS host drivers can be considered as an extension of the DMS cloud reaching to the data of the application servers. As illustrated in FIG. 4, the DMS network offers a wide range of data services that include, by way of example only: data protection (and recovery), disaster recovery (data distribution and data replication), data copy, and data query and access. The data services and, in particular, data protection and disaster recovery, preferably are stream based data services where meaningful application and data events are forwarded from one end point to another end point continuously as a stream. More generally, a stream-based data service is a service that involves two end points sending a stream of real-time application and data events. For data protection, this means streaming data from a data source (e.g., an external host server) into a DMS cluster, where the data source and its entire history can be captured and protected. Data distribution refers to streaming a data source from one DMS cluster into another DMS cluster, while data replication refers to streaming a data source from a DMS cluster to another external host server. Preferably, both data distribution and data replication are real-time continuous movement of a data source from one location to another to prepare for disaster recovery. Data replication differs from data distribution in that, in the latter case, the data source is replicated within the DMS network where the history of the data source is maintained. Data replication typically is host based replication, where the continuous events and changes are applied to the host data such that the data is overwritten by the latest events; therefore, the history is lost. Data copy is a data access service where a consistent data source (or part of a data source) at any point-in-time can be constructed and retrieved. This data service allows data of the most current point-in-time, or a specific point-in-time in the past, to be retrieved when the data is in a consistent state. These data services are merely representative.

The DMS provides these and other data services in real-time with data and application awareness to ensure continuous application data consistency and to allow for fine grain data access and recovery. To offer such application and data aware services, the DMS has the capability to capture fine grain and consistent data. As will be illustrated and described, a given DMS host driver uses an I/O filter to intercept data events between an application and its primary data storage. The host driver also receives data and application events directly from the application and database.

Figure 5:
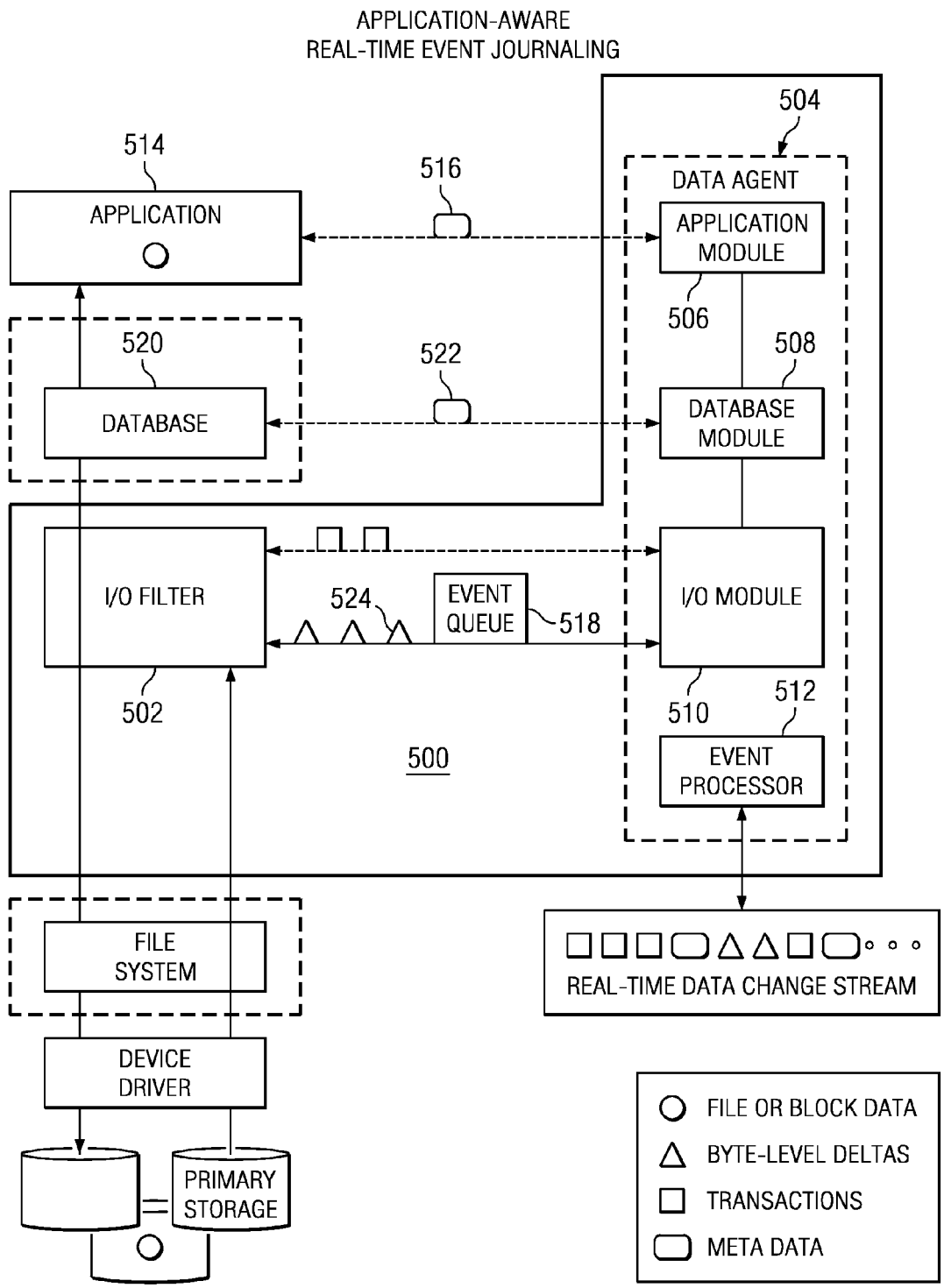
FIG. 5 is a representative host driver according to a preferred embodiment of the present invention having an I/O filter and one or more data agents.

Referring now to FIG. 5, an illustrative embodiment is shown of a DMS host driver 500. As noted above, the host driver 500 may be embedded in the host server where the application resides, or in the network on the application data path. By capturing data through the application, fine grain data is captured along with application events, thereby enabling the DMS cluster to provide application aware data services in a manner that has not been possible in the prior art.

In this embodiment, a host server embedded host driver is used for illustrating the driver behavior. In particular, the host driver 500 in a host server connects to one of the DMS nodes in a DMS cluster (in a DMS region) to perform or facilitate a data service. The host driver preferably includes two logical subsystems, namely, an I/O filter 502, and at least one data agent 504. An illustrative data agent 504 preferably includes one or more modules, namely, an application module 506, a database module 508, an I/O module 510, and an event processor or event processing engine 512. The application module 506 is configured with an application 514, one or more network devices and/or the host system itself to receive application level events 516. These events include, without limitation, entry or deletion of some critical data, installation or upgrade of application software or the operating system, a system alert, detecting of a virus, an administrator generated checkpoint, and so on. One or more application events are queued for processing into an event queue 518 inside or otherwise associated with the data agent. The event processor 512 over time may instruct the application module 506 to re-configure with its event source to capture different application level events.

If an application saves its data into a database, then a database module 508 is available for use. The database module 508 preferably registers with a database 520 to obtain notifications from a database. The module 508 also may integrate with the database 520 through one or more database triggers, or it may also instruct the database 520 to generate a checkpoint 522. The database module 508 also may lock the database 520 (or issue a specific API) to force a database manager (not shown) to flush out its data from memory to disk, thereby generating a consistent disk image (a binary table checkpoint). This process of locking a database is also known as "quiescing" the database. An alternative to quiescing a database is to set the database into a warm backup mode. After a consistent image is generated, the database module 508 then lifts a lock to release the database from its quiescent state. The database events preferably are also queued for processing into the event queue 518. Generalizing, database events include, without limitation, a database checkpoint, specific database requests (such as schema changes or other requests), access failure, and so on. As with application module, the event processor 512 may be used to re-configure the events that will be captured by the database module.

The I/O module 510 instructs the I/O filter 502 to capture a set of one or more I/O events that are of interest to the data agent. For example, a given I/O module 510 may control the filter to capture I/O events synchronously, or the module 510 may control the filter to only capture several successful post I/O events. When the I/O module 510 receives I/O events 524, it forwards the I/O events to the event queue 518 for processing. The event processor 512 may also be used to re-configure the I/O module 510 and, thus, the I/O filter 502.

The event processor 512 functions to generate an application aware, real-time event journal (in effect, a continuous stream) for use by one or more DMS nodes to provide one or more data services. Application aware event journaling is a technique to create real-time data capture so that, among other things, consistent data checkpoints of an application can be identified and metadata can be extracted. For example, application awareness is the ability to distinguish a file from a directory, a journal file from a control or binary raw data file, or to know how a file or a directory object is modified by a given application. Thus, when protecting a general purpose file server, an application aware solution is capable of distinguishing a file from a directory, and of identifying a consistent file checkpoint (e.g., zero-buffered write, flush or close events), and of interpreting and capturing file system object attributes such as an access control list. By interpreting file system attributes, an application aware data protection may ignore activities applied to a temporary file. Another example of application awareness is the ability to identify a group of related files, directories or raw volumes that belong to a given application. Thus, when protecting a database with an application aware solution, the solution is capable of identifying the group of volumes or directories and files that make up a given database, of extracting the name of the database, and of distinguishing journal files from binary table files and control files. It also knows, for example, that the state of the database journal may be more current than the state of the binary tables of the database in primary storage during runtime. These are just examples, of course. In general, application aware event journaling tracks granular application consistent checkpoints; thus, when used in conjunction with data protection, the event journal is useful in reconstructing an application data state to a consistent point-in-time in the past, and it also capable of retrieving a granular object in the past without having to recover an entire data volume. Further details of the event journaling technique are described in commonly-owned, co-pending application Ser. No. 10/842,286, filed May 10, 2004, and titled "METHOD AND SYSTEM FOR REAL-TIME EVENT JOURNALING TO PROVIDE ENTERPRISE DATA SERVICES." The subject matter of that application is incorporated herein by reference.

Figure 6:
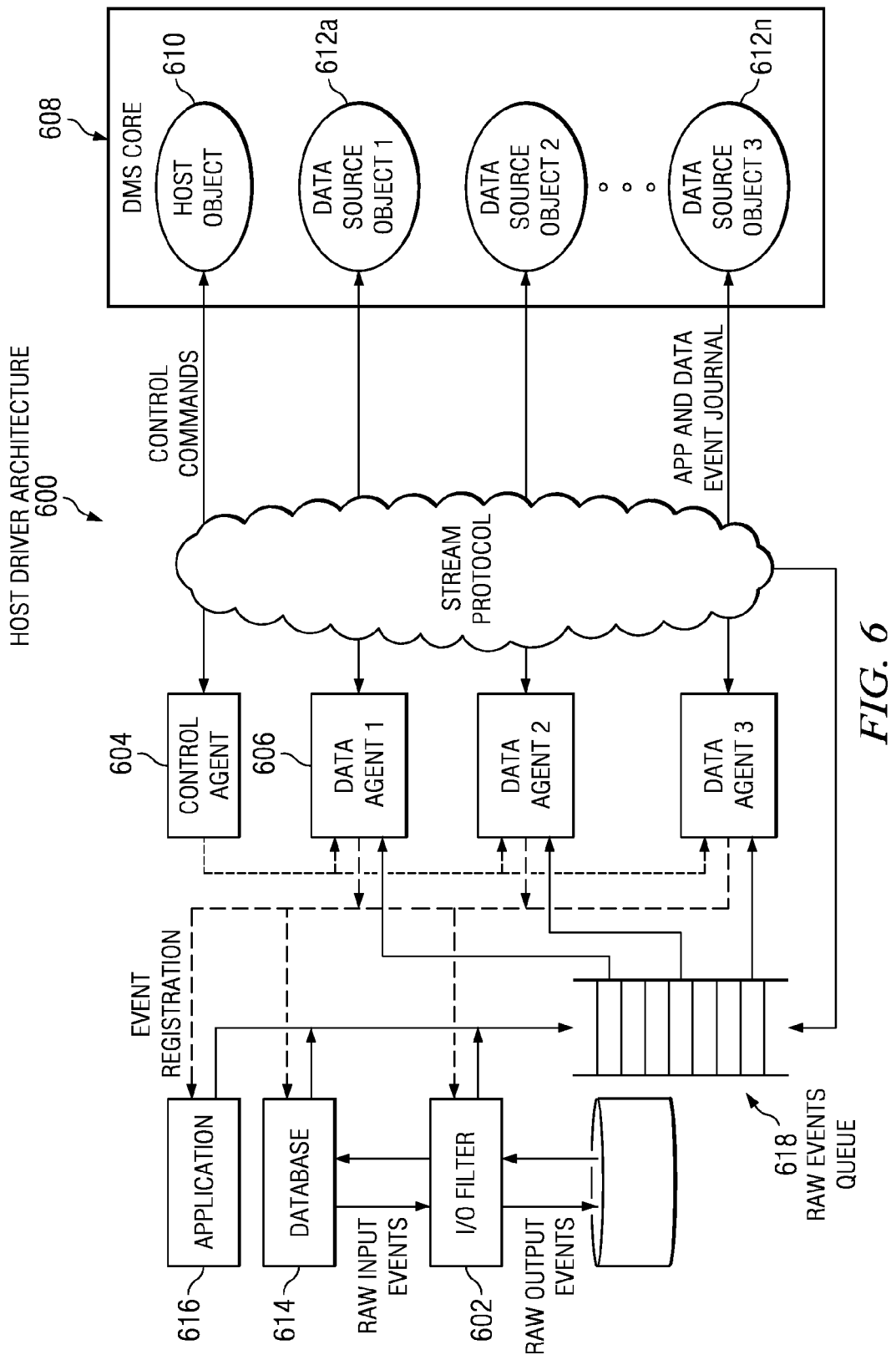
FIG. 6 illustrates the host driver architecture in a more general fashion.

Referring now to FIG. 6, the host driver architecture is shown in a more generalized fashion. In this drawing, the host driver 600 comprises an I/O filter 602, a control agent 604, and one or more data agents 606. The control agent 604 receives commands from a DMS core 608, which may include a host object 610 and one or more data source objects 612a-n, and it controls the behavior of the one or more data agents 606. Preferably, each data agent 606 manages one data source for one data service. For example, data agent 1 may be protecting directory "dir1," data agent 2 may be copying file "foo.html" into the host, and data agent 3 may be protecting a database on the host. These are merely representative data service examples, of course. Each data agent typically will have the modules and architecture described above and illustrative in FIG. 5. Given data agents, of course, may share one or more modules depending on the actual implementation. In operation, the data agents register as needed with the I/O filter 602, the database 614 and/or the application 616 to receive (as the case may be): I/O events from the I/O filter, database events from the database, and/or application events from the application, the operating system and other (e.g., network) devices. Additional internal events or other protocol-specific information may also be inserted into the event queue 618 and dispatched to a given data agent for processing. The output of the event processor in each data agent comprises a part of the event journal.

As also indicated in FIG. 6, preferably the host driver communicates with the DMS core using an extensible data management protocol (XDMP) 618 that is marshaled and un-marshaled through a device driver kit (DDK). More generally, the host driver communicates with the DMS core using any convenient message transport protocol. As will be described, given XDMP events may also be inserted into the event queue and processed by the event processor.

Figure 7:
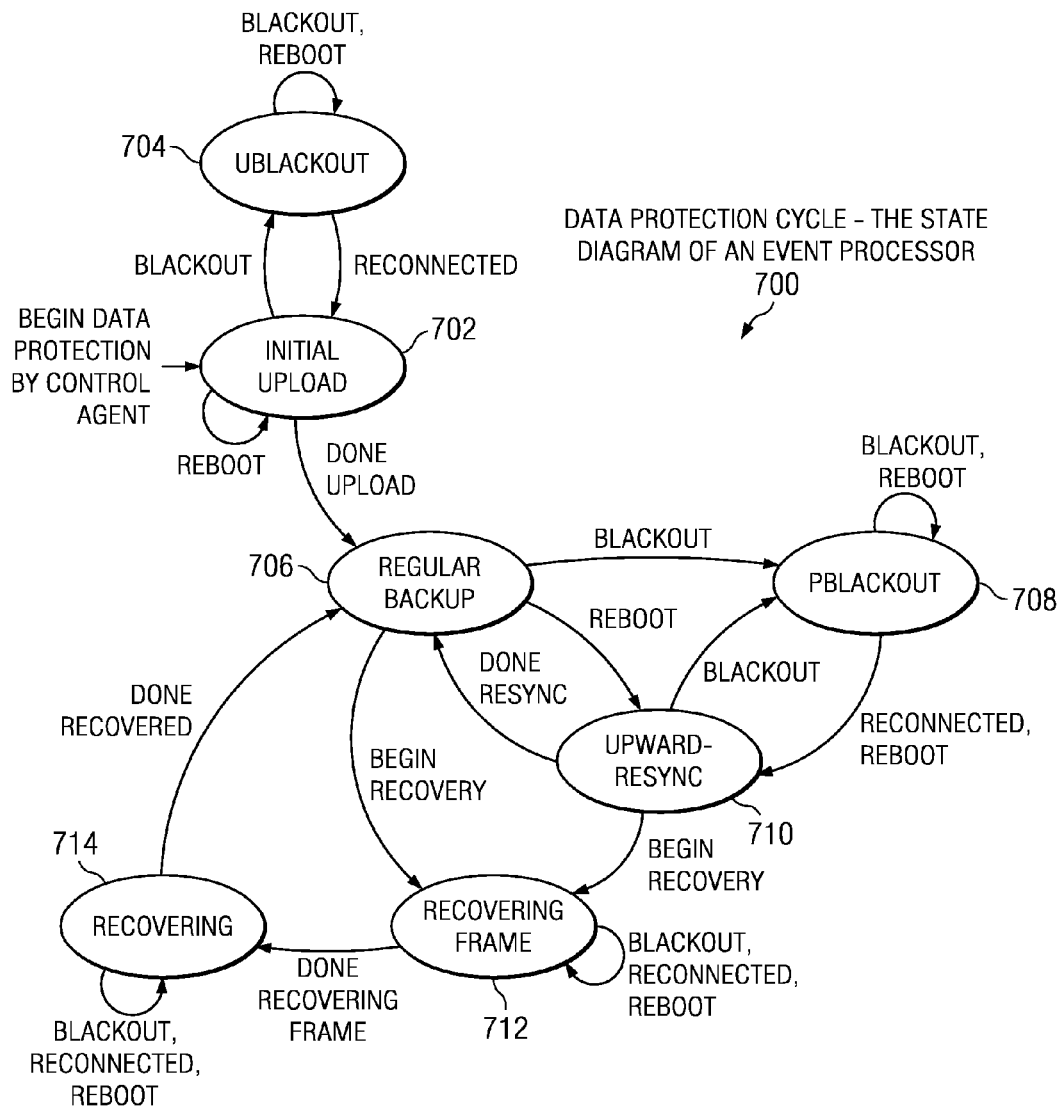
FIG. 7 illustrates a preferred implementation of an event processor finite state machine (FSM) that provides automated, real-time, continuous, zero downtime data protection service.

FIG. 7 illustrates a preferred embodiment of the invention, wherein a given event processor in a given host driver provides a data protection service by implementing a finite state machine 700. Details of the finite state machine are described in commonly-owned U.S. Pat. No. 7,096,392. The subject matter of that application is incorporated herein by reference. The behavior of the event processor depends on what state it is at, and this behavior preferably is described in an event processor data protection state table. The "state" of the event processor preferably is driven by a given "incident" (or event) as described in an event processor data protection incident table. Generally, when a given incident occurs, the state of the event processor may change. The change from one state to another is sometimes referred to as a transition. One of ordinary skill in the art will appreciate that FIG. 7 illustrates a data protection state transition diagram of the given event processor. In particular, it shows an illustrative data protection cycle as the FSM 700. At each state, as represented by an oval, an incident, as represented by an arrow, may or may not drive the event processor into another state. The tail of an incident arrow connects to a prior state (i.e., branches out of a prior state), and the head of an incident arrow connects to a next state. If an incident listed in the incident table does not branch out from a state, then it is invalid for (i.e., it cannot occur in) that state. For example, it is not possible for a "Done-Upload" incident to occur in the "UBlackout" state.

With reference now to FIGS. 6-7, the data protection service is initiated on a data source in a host server as follows. As illustrated in FIG. 6, it is assumed that a control agent 604 has created a data agent 606 having an event processor that outputs the event journal data stream, as has been described. As this point, the event processor in the data agent 606 is transitioned to a first state, which is called "Initial-Upload" for illustrative purposes. During the "Initial-Upload" state 702, the event processor self-generates upload events, and it also receives other raw events from its associated event queue. The event processor simultaneously uploads the initial baseline data source, and it backs up the on-going changes from the application. Preferably, only change events for data already uploaded are sent to the DMS. The event processor also manages data that is dirty or out-of-sync, as indicated in a given data structure. In particular, a representative data structure is a "sorted" source tree, which is a list (sorted using an appropriate sort technique) that includes, for example, an entry per data item. The list preferably also includes an indicator or flag specifying whether a given data item is uploaded or not, as well as whether the item is in- (or out-of) sync with the data in the DMS. Additional information may be included in the sorted source tree, as will be described in more detail below. As will be seen, the event processor performs resynchronization on the items that are out-of-sync. As indicated in FIG. 7, a "Reboot" incident that occurs when the state machine is in state 702 does not change the state of the event processor; rather, the event processor simply continues processing from where it left off. In contrast, a "Blackout" incident transitions the event processor to a state 704 called (for illustration only) "UBlackout." This is a blackout state that occurs as the event processor uploads the initial baseline data source, or as the event processor is backing up the on-going changes from the application. The state 704 changes back to the "Initial-Upload" state 702 when a so-called "Reconnected" incident occurs.

When upload is completed and all the data is in synchronized with the data in the DMS, the event processor generates a "Done-upload" incident, which causes the event processor to move to a new state 706. This new state is called "Regular-backup" for illustrative purposes. During the regular backup state 706, the event processor processes all the raw events from the event queue, and it generates a meaningful checkpoint real time event journal stream to the DMS for maintaining the data history. This operation has been described above. As illustrated in the state transition diagram, the event processor exits its regular backup state 706 under one of three (3) conditions: a blackout incident, a reboot incident, or a begin recovery incident. Thus, if during regular backup a "Blackout" incident occurs, the state of the event processor transitions from state 706 to a new state 708, which is called "PBlackout" for illustration purposes. This is a blackout state that occurs during regular backup. If, however, during regular backup, a "Reboot" incident occurs, the event processor transitions to a different state 710, which is called "Upward-Resync" for illustrative purposes. The upward resynchronization state 710 is also reached from state 708 upon a Reconnected incident during the latter state. Upward resynchronization is a state that is entered when there is a suspicion that the state of the data in the host is out-of-sync with the state of the most current data in the DMS. For this transition, it should also be known that the data in the host server is not corrupted. Thus, a transition from state 706 to state 710 occurs because, after "Reboot," the event processor does not know if the data state of the host is identical with the state of the data in DMS. During the "Upward-Resync" 710 state, whether the state is reached from state 706 or state 708, the event processor synchronizes the state of the host data to the state of the DMS data (in other words, to bring the DMS data to the same state as the host data). During this time, update events (to the already synchronized data items) are continuously forwarded to the DMS as a real time event stream. When the resynchronization is completed, the data state at both the host and the DMS are identical, and thus a "Done-Resync" incident is generated. This incident transitions the event processor back to the "Regular-backup" state 706. Alternatively, with the event processor in the Upward-Resync state 710, a "Begin-Recovery" incident transitions the event processor to yet another new state 712, which is referred to "Recovering-frame" for illustration purposes.

In particular, once a baseline data is uploaded to the DMS, data history is streamed into the DMS continuously, preferably as a real time event journal. An authorized user can invoke a recovery at any of the states when the host server is connected to the DMS core, namely, during the "Regular-backup" and "Upward-resync" states 706 and 710. If the authorized user does so, a "Begin-recovery" incident occurs, which drives the event processor state to the "Recovering-frame" state 712.

During the "Recovering-frame" state 712, the event processor reconstructs the sorted source tree, which (as noted above) contains structural information of the data to be recovered. During state 712, and depending on the underlying data, the application may or may not be able to access the data. Once the data structure is recovered, a "Done-Recovering-Frame" incident is generated, which then transitions the event processor to a new state 714, referred to as "Recovering" for illustration purposes. Before the data structure is recovered, incidents such as "Blackout," "Reconnected," and "Reboot" do not change the state of the event processor. During the "Recovering" state 714, the event processor recovers the actual data from the DMS, preferably a data point at a time. It also recovers data as an application access request arrives to enable the application to continuing running. During state 714, application update events are streamed to the DMS so that history is continued to be maintained, even as the event processor is recovering the data in the host. When data recovery is completed, once again the state of the data (at both ends of the stream) is synchronized, and the corruption at the host is fixed. Thus, a so-called "Done-recovered" incident is generated, and the event processor transitions back to the "Regular-backup" state 706.

During the "UBlackout" or the "PBlackout" states (704 or 708), the event processor marks the updated data item as dirty or out-of-sync in its sorted source tree.

Processing continues in a cycle (theoretically without end), with the event processor transitioning from state-to-state as given incidents (as described above) occur. The above described incidents, of course, are merely representative.

Although not indicated in the state transition diagram (FIG. 7), a "termination" incident may be introduced to terminate the data protection service at a given state. In particular, a termination incident may apply to a given state, or more generally, to any given state, in which latter case the event processor is transitioned (from its then-current state) to a terminated state. This releases the data agent and its event processor from further provision of the data protection service.

Further Details of the Initial Upload and Upward-Resync States

Figure 8:
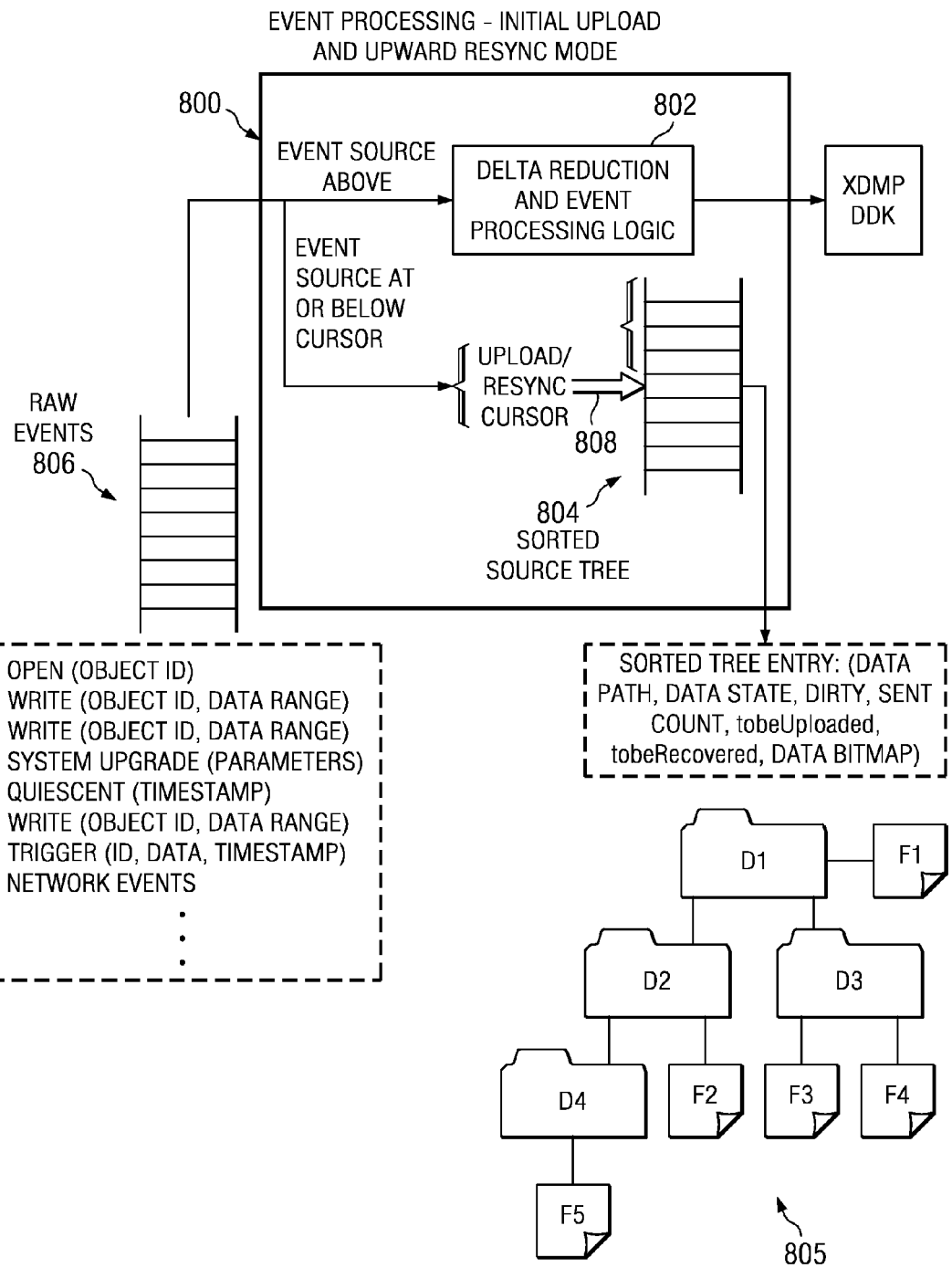
FIG. 8 is a simplified diagram illustrating how the event processor operates in the initial upload and resynchronization states.

FIG. 8 illustrates the event processor behavior during respective upload and upward-resynchronization states (702 and 710, respectively, in FIG. 7) as part of the data protection service. As described above, the upload state creates baseline data. Preferably, the upload is a stream of granular application-aware data chunks that are attached to upload events. During this upload phase, the application does not have to be shutdown, which is highly advantageous. Simultaneously, while the baseline is uploading and as the application updates the data on the host, checkpoint granular data, metadata, and data events are continuously streamed into the DMS core, in real-time. Moreover, and as will be described below, the update events for the data that are not already uploaded preferably are dropped so that only the update events for data already uploaded are streamed to the DMS.

As illustrated, the event processor 800 includes the event processor logic 802 that has been previously described. Processor 800 also has associated therewith a given data structure 804, preferably a sorted source tree. A sorted source tree is a list, which may be sorted using any convenient sorting technique, and it is used to manage the handling of data during the upload and/or upward-resync states. In an illustrated embodiment, the sorted source tree is a directory sort list, with directories and their associated files sorted in a depth-first manner as illustrated schematically at reference numeral 805. Preferably, the list includes one or more one attributes per data item. A given attribute may have an associated flag, which indicates a setting for the attribute. Thus, for example, representative attributes include: data path, data state, dirty, sent count, to be uploaded, to be recovered, and data bitmap. The "data path" attribute typically identifies the path name (e.g., c:\mydirectory\foo.txt) of a file or directory where the data item originated, the "data state" attribute identifies a state of the data file (e.g., closed, opened for read, opened for write, the accumulated changes since a last checkpoint, or the like), and the "dirty" attribute identifies whether the item is "out-of-sync" with the data in the DMS (which means that the file or directory in the host is more up-to-date than the corresponding file or directory in DMS). In the latter case, upward resynchronization with respect to DMS is required. For example, a file can be "dirty" if it is updated during a blackout, or if the delta events for the file fail to be applied at the DMS core. When a host server is rebooted, all items are assumed to be dirty. The "to be uploaded" attribute means that the item is not yet uploaded but needs to be, the "to be recovered" attribute means that the item, although previously, uploaded, must be recovered, the "sent count" attribute refers to a number of message(s) that are forwarded to the DMS host during the upload and/or upward resynchronization, and the "data bitmap" attribute is used for virtual recovery of a large file. In particular, virtual recovery may involve the following process. A large file is divided into blocks, and the bitmap is used to indicate if a block is recovered or not. If a block has a value 0, it is not recovered; if the block has a value 1, it is recovered. Preferably, the system recovers a large file in sequential block order, although this is not a requirement. In the event an application request arrives for a data block that is not yet recovered, preferably the system moves in the block from DMS immediately so that the application does not have to wait for it.

Raw events are available on the event queue 806, as described above. A set of illustrative events are shown in the drawing and they include, in this example: Open (object ID), Write (object ID, data range), Write (object ID, data range), System upgrade (timestamp), Write (object ID, data range), Trigger (ID, data, timestamp), Network events, and so on. Of course, this list is merely for illustration purposes.

In another illustrated embodiment, the protected data source may be a database, in which case the sorted source tree may be a list of files or volumes the database uses. In this embodiment, the sorting order may be in ascending order of the database transaction log, the binary table files or volumes, and the configuration files or volumes. If a volume-based database is to be protected, each volume can be treated like a file.

As will be described, a cursor 808 is set at the beginning of the sorted source tree 804 and is incremented. Typically, events that occur "above" the cursor are processed immediately by the event processor logic 802 and sent to the DMS node. Events that occur at or below the cursor typically may be subject to further processing, as will be described. Referring now to FIGS. 9-13, the operation of the event processor (during the initial upload and upward-resynchronization states) is described for an illustrative embodiment in more detail. These process flows are not meant to be taken by way of limitation.

Figure 9:
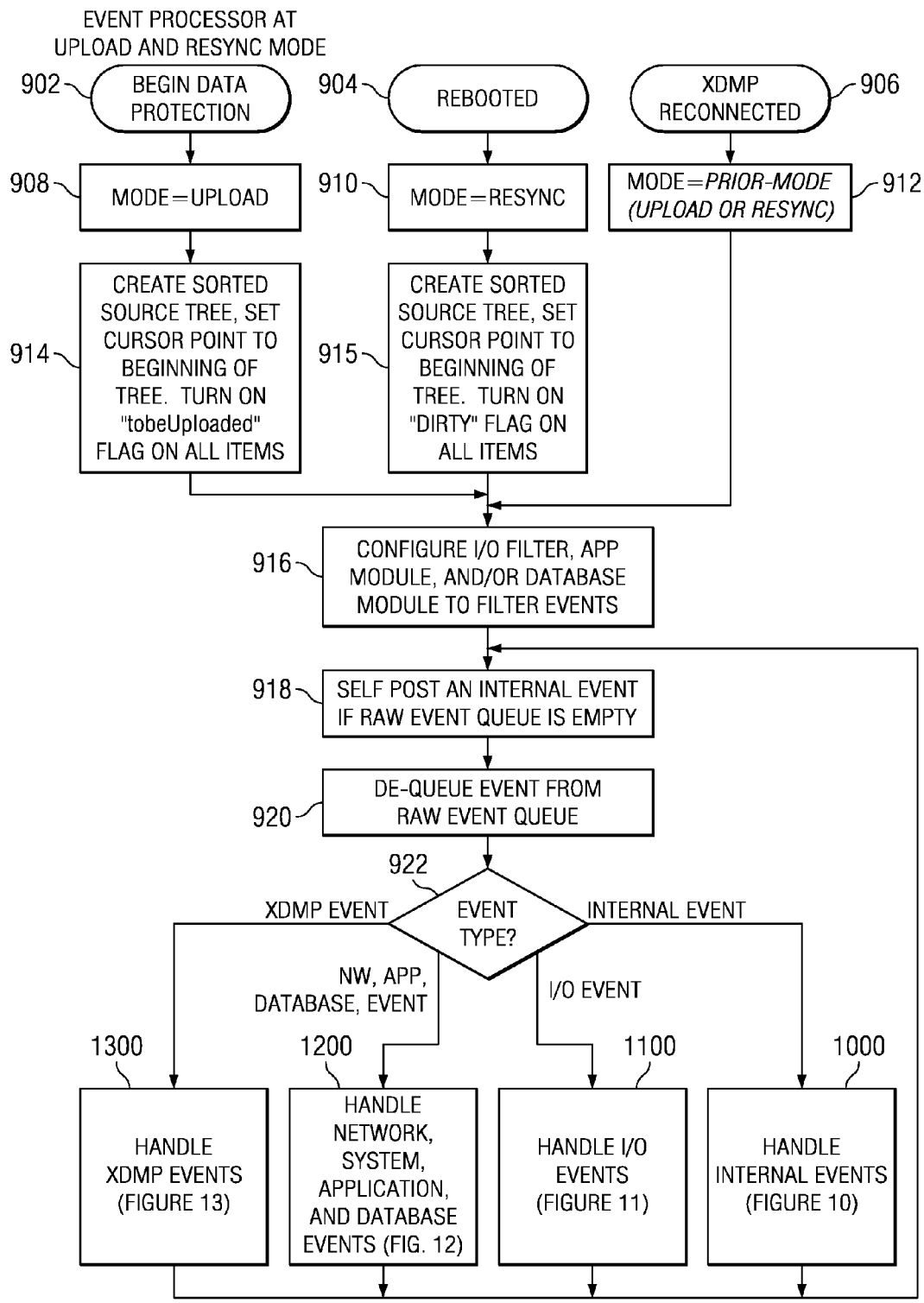
FIG. 9 is a flowchart illustrating the steps performed by the event processor during the initial upload and resynchronization states.
Figure 10:
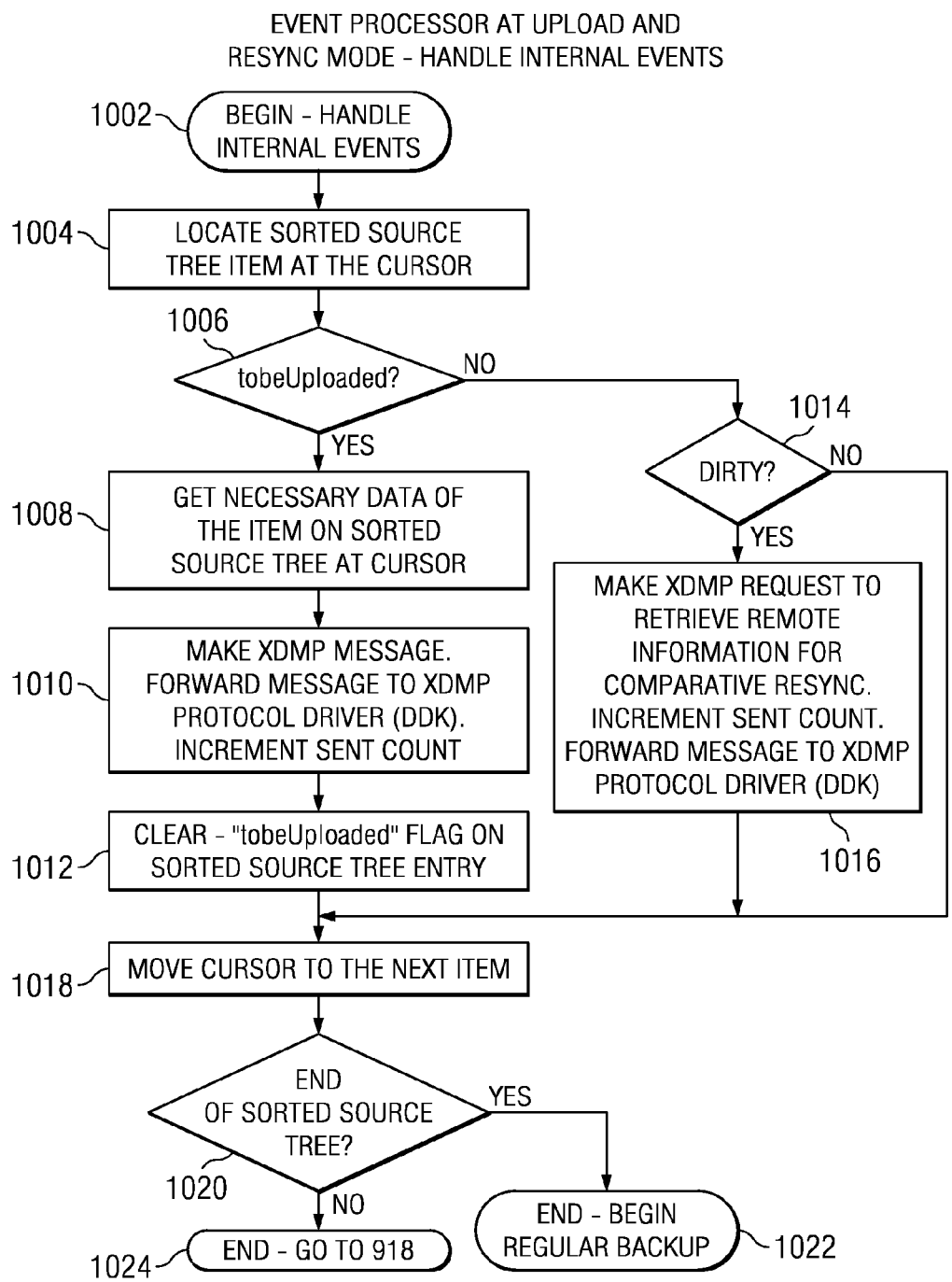
FIG. 10 is a flowchart illustrating how the event processor handles internal events, which is a step of the flowchart in FIG. 9.
Figure 11:
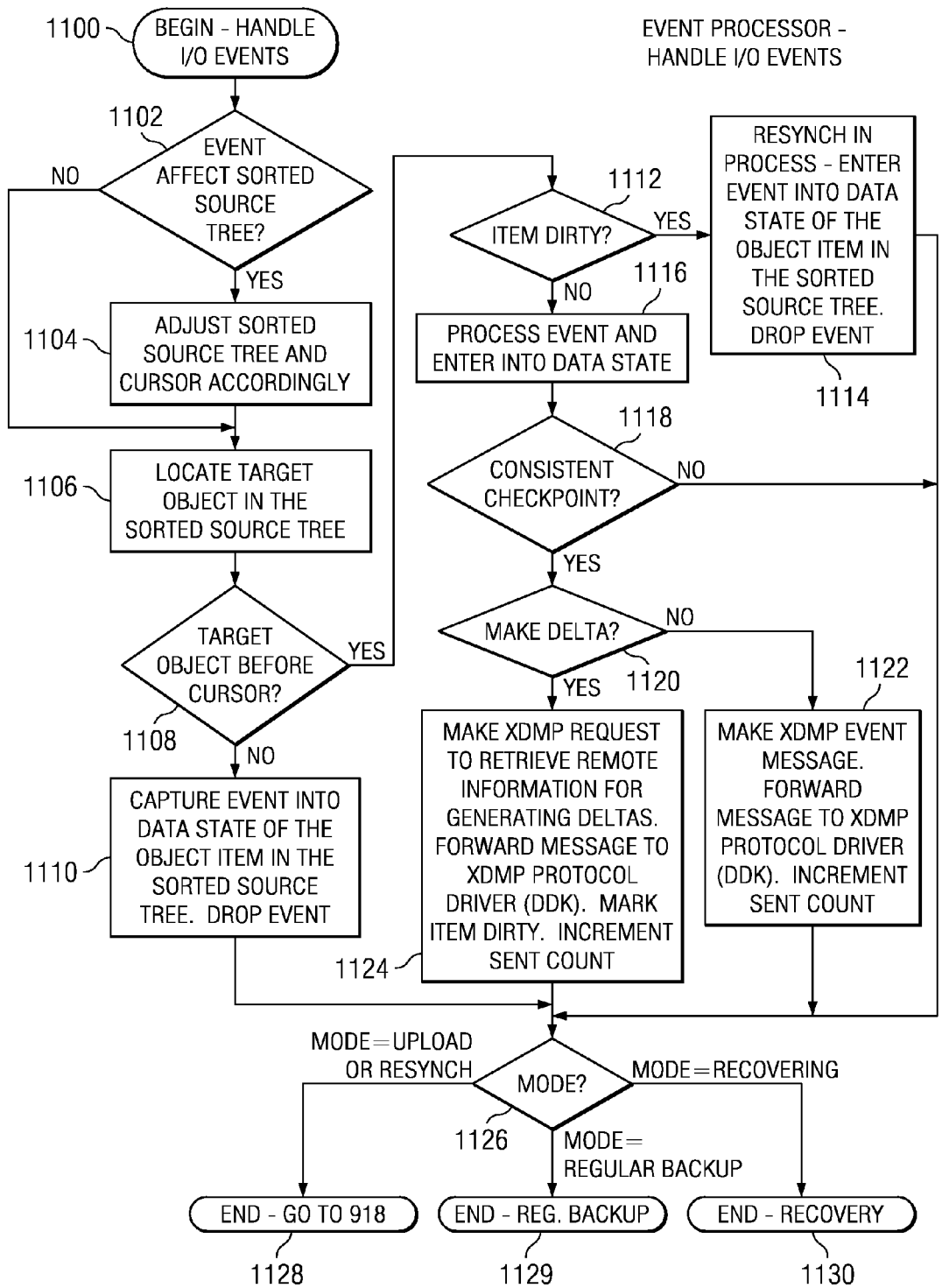
FIG. 11 is a flowchart illustrating how the event processor handles I/O events, which is a step of the flowchart in FIG. 9.
Figure 12:
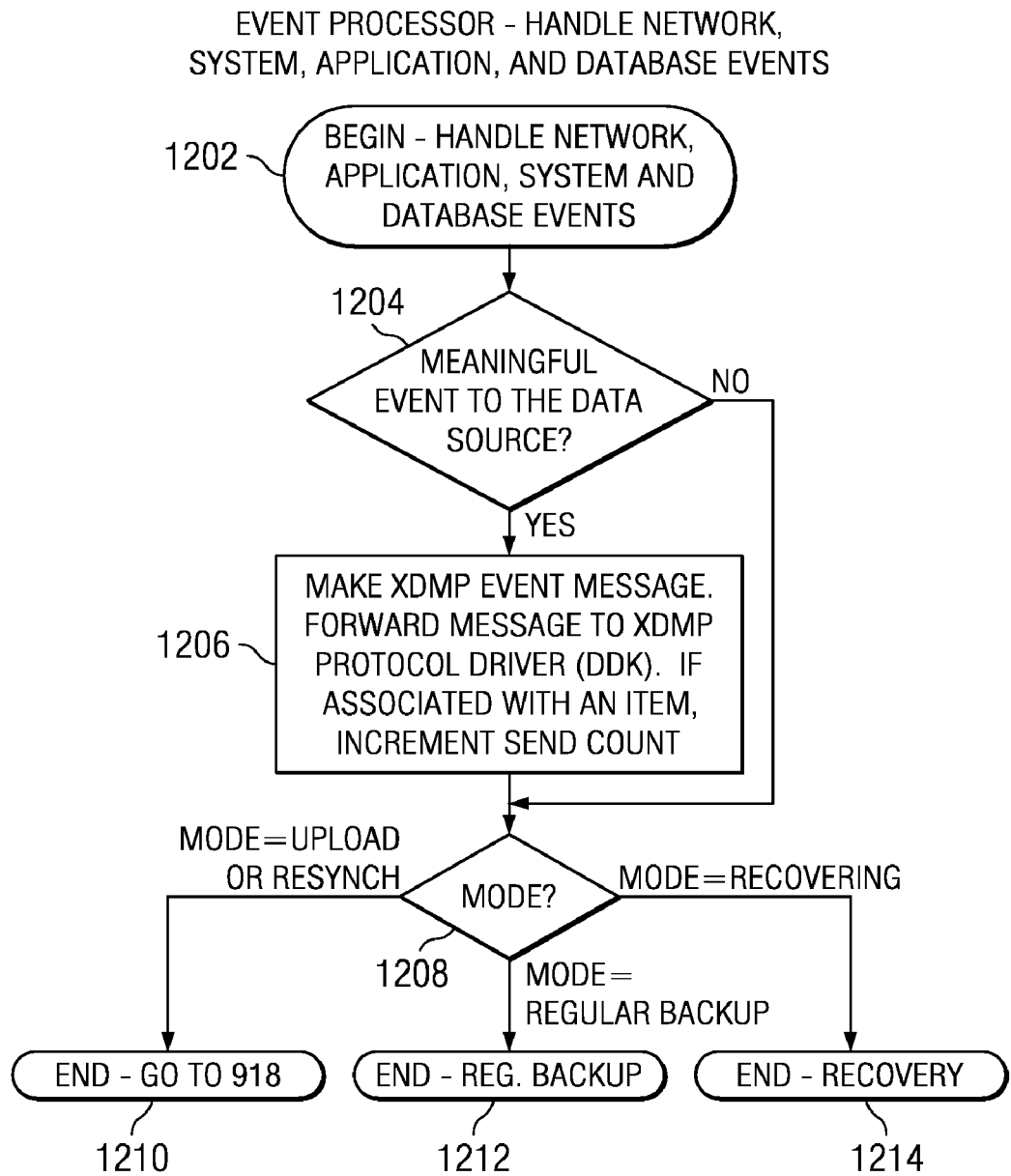
FIG. 12 is a flowchart illustrating how the event processor handles network, system, application and database events, which is a step of the flowchart in FIG. 9.
Figure 13:
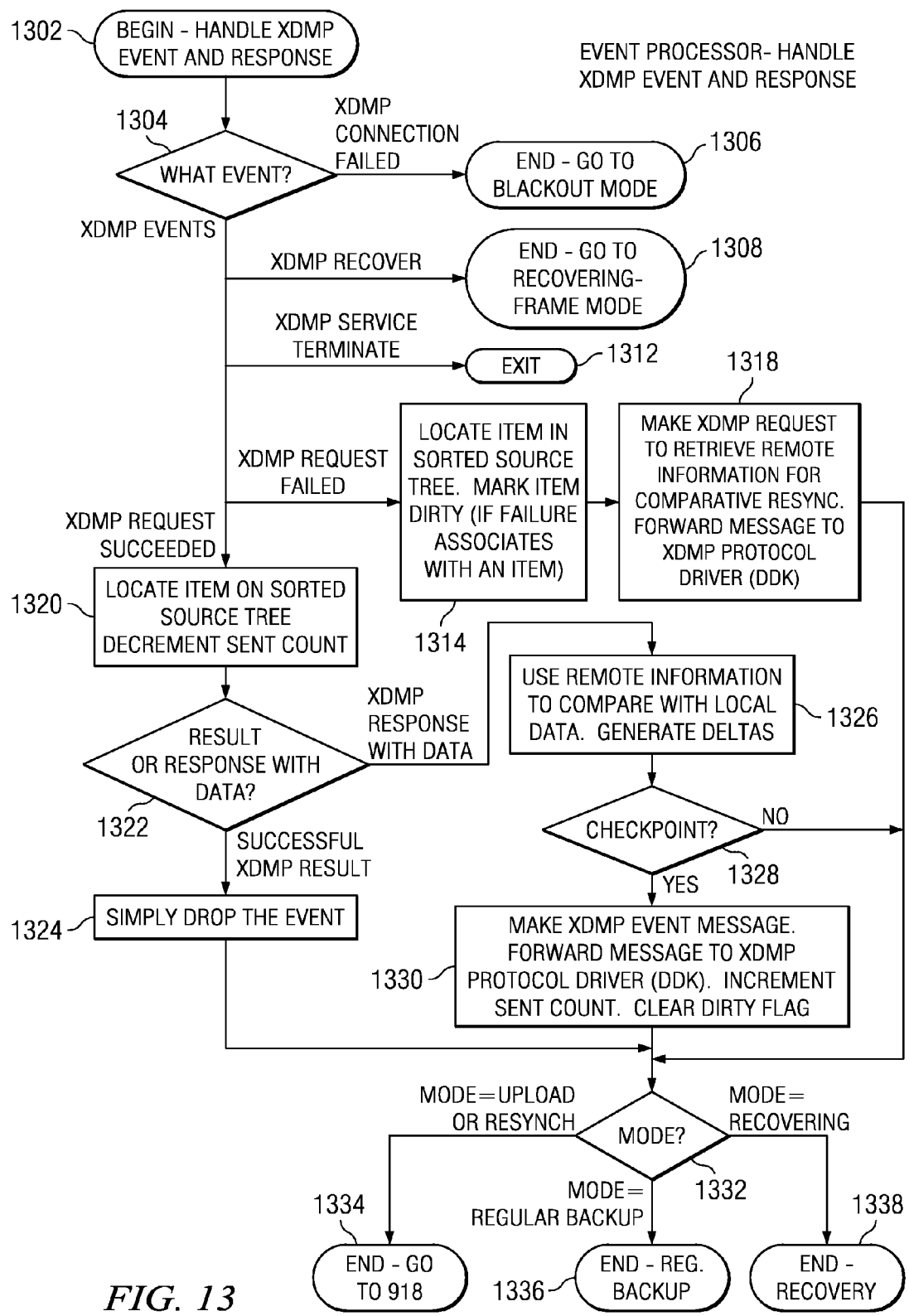
FIG. 13 is a flowchart illustrating how the event processor handles protocol transport events, which is a step of the flowchart in FIG. 9.

As illustrated in FIG. 9 (and with cross-reference to the FSM of FIG. 7), in an illustrated embodiment there are three (3) possible initial entry points (corresponding to the incidents described above) with respect to the upload and upward-resync states: begin data protection, step 902, rebooted, step 904, and reconnected 906. Step 902 is entered when the finite state machine receives an incident that initiates the data protection cycle. At step 908, the mode is set to upload, which indicates the upload state has been entered. If the process is entered at step 904, the mode is set at step 910 to resync. If the process is entered at step 906, the mode is set at step 912 to prior-mode, which is a value that can represent either the upload or resync state. Thus, the "mode" is synonymous with the "state" as that term has been described above with respect to the finite state machine. In the upload process path, the process flow continues at step 914, where the event processor creates the sorted source tree and sets the cursor to the beginning of that tree. At step 914, the event processor also sets the "to be uploaded" flag on all data items. The process then continues at step 916, which is also reached through step 915 in the resync process path. In particular, at step 915, the event processor creates the sorted source tree, sets the cursor to point to the beginning of the tree, and sets the "dirty" flag on all data items. Step 916 is also reached from step 912, as indicated. At step 916, the event processor configures the I/O filter, the application module, and/or the database module to begin filtering events, as has been described above. The process flow then continues at step 918, during which the event processor self posts an internal event if the associated event queue is empty. At step 920, the event processor removes an event from the event queue. A determination is then made at step 922 to test whether the event is an internal event, an I/O event, an NSAD (network, system, application or database) event, or an XDMP event. FIG. 10 illustrates the processing if the event is an internal event. This is step 1000. FIG. 11 illustrates the processing if the event is an input/output event. This is step 1100. FIG. 12 illustrates the processing if the event is a network, system, application or database event. This is step 1200. Finally, FIG. 13 illustrates the processing if the event is an XDMP event. This is step 1300. After the event is processed, the routine returns to step 918, and the iteration continues.

FIG. 10 illustrates the processing for an internal event. The routine begins at step 1002. At step 1004, the event processor locates the sorted source tree item that is at the cursor. A test is then run at step 1006 to determine whether the "to be uploaded" flag is set. If yes, the routine branches to step 1008, where the event processor obtains the necessary data of the item on the sorted source tree at the cursor position. Continuing down this processing path, at step 1010, the event processor generates a message, associates (e.g., bundles) the data with the message, forwards that message (which now includes the data) to the XDMP protocol driver (for delivery to the DMS core), and increments the sent count. At step 1012, the event processor clears the "to be uploaded" flag on the sorted source tree for this particular entry, after which the event processor continues at step 1018 by moving the cursor to the next item in the sorted source tree. Alternatively, when the result of the test at step 1006 indicates that the "to be uploaded" flag is not set, the routine branches to step 1014 to determine whether the item is dirty. If not, the routine branches to step 1018, as illustrated. If the result of the test at step 1014 indicates that the item is dirty, the routine branches to step 1016. At this step, the event processor makes a request to a DMS core to retrieve remote information to enable it to perform a comparative resynchronization, increments the sent count, and forwards the message to the XDMP protocol driver (for delivery to the DMS core). Control then continues at step 1018, as has been described. After step 1018, a test is performed at step 1020 to determine whether the sorted source tree has been completely parsed. If yes, the routine branches to step 1022 to begin the regular backup state. If, however, the result of the test at step 1020 indicates that the sorted source tree is not yet parsed, the routine returns to step 918 in FIG. 9.

FIG. 11 illustrates the processing for an input/output (I/O) event. The routine begins at step 1102 to test whether the event in question affects the sorted source tree. If so, the routine branches to step 1104, during which the event processor adjusts the sorted source tree and the cursor accordingly. Control then returns to step 1106, which step is also reached when the outcome of the test at step 1102 is negative. At step 1106, the event processor locates the target object in the sorted source tree. At step 1108, a test is performed to determine whether the target object is above the cursor. If not, the routine continues at step 1110 to capture the relevant information of the event into a data state of the object item in the sorted source tree. Thus, e.g., if the protected data source is a file system the relevant information might be a "file open." At step 1110, the event processor also drops the event. The process flow then continues at step 1126. Alternatively, in the event the result of the test at step 1108 indicates that the target object is above the cursor position on the sorted source tree, the process flow branches to step 1112. At this step, a test is performed to determine whether the item is dirty. If so, the event processor performs step 1114, which means the resynchronization is in progress. Thus, the event processor enters the event the relevant information of the event into a data state of the object item in the sorted source tree, drops the event, and branches to step 1126. Thus, in a representative example where changes since a last checkpoint are being accumulated, the relevant information might be the changed data. If, however, the outcome of the test at step 1112 indicates that the item is not dirty, the routine continues with step 1116 to process the event and enter the relevant information (e.g., a transaction record, attribute, or binary data changes) into the data state. In this process flow path, the routine then continues at step 1118, where a test is performed to determine whether a consistent checkpoint has been reached. If not (an example would be a file write on a regular file system), the routine branches to step 1126. If, however, the result of the test at step 1118 indicates a consistent checkpoint (e.g., a file "flushed" or "closed" for a file system, or a transaction checkpoint of a database), a further test is performed at step 1120 to determine whether the event processor needs to create a delta value from the accumulated changes since the last checkpoint in the data state. If not (e.g., because there is already a transaction record for the event), the routine continues at step 1122 to generate an event message, forward that message to the XDMP protocol driver (for delivery to the DMS core), and then increment the sent count. If, however, the outcome of the test at step 1120 indicates that the event processor needs to create a delta value (e.g., to generate deltas from the accumulated file changes upon a file "flushed" event), the routine continues at step 1124. During this step, the event processor makes a request to retrieve remote information that is necessary to generate the delta values, forwards the appropriate request message to the XDMP protocol driver (for delivery to the DMS core), marks the item as dirty, and increments the sent count. Processing continues at step 1126 from either of step 1122 or step 1124. At step 1126, a test is made to determine the mode. If the mode is upload or resync, the routine branches to step 918 in FIG. 9. This is step 1128. If the mode is regular backup, the routine enters the regular backup state. This is step 1129. If the mode is recovering, the routine enters a recovery mode. This is step 1130.

FIG. 12 illustrates how the event processor handles network, system, application and/or database events. The routine begins at step 1202. At step 1204, a test is made to determine whether the event in question is meaningful. If not, the routine branches to step 1208. If the event is meaningful to the data source (e.g., a database checkpoint event), the routine continues at step 1206. At this step, the event processor generates an event message, forwards that message to the XDMP protocol driver and, if the event is associated with an item, the event processor increments the sent count. The event may be bundled with relevant data of the associated items. For example, if the event is a database checkpoint, deltas from the binary tables may be generated and associated (e.g., bundled) with the XDMP message. Processing then continues at step 1208. At step 1208, a test is made to determine the mode. If the mode is upload or resync, the branches to step 918 in FIG. 9. This is step 1210. If the mode is regular backup, the routine enters the regular backup state. This is step 1212. If the mode is recovering, the routine enters a recovery mode. This is step 1214.

FIG. 13 illustrates how the event processor handles given XDMP events and responses. As noted above, any convenient transport protocol may be used between the DMS host driver and DMS core. In this example, the routine begins at step 1302. At step 1304, a test is performed to determine the nature of the XDMP protocol event. If the event is a "connection failed," the routine branches to step 1306, which indicates the blackout state. If the event is "recover," the routine branches to step 1308, which indicates that the event processor should enter the recovering-frame state. If the event is a "service terminate," the event processor exits the FSM, which is state 1312. If the event is a "request failed," the routine continues at step 1314. At this step, the event processor locates the item in the sorted source tree and marks the item dirty (if a failure is associated with the item). The routine then continues in this process flow path with step 1318, with the event processor making a request to retrieve information to enable it to perform a comparative resync. During step 1318, the event processor also forwards the message to the protocol driver. Finally, if the event is a "request succeeded," the event processor continues at step 1320 to locate the item on the sorted source tree and decrements the sent count. In this process path, the routine then continues at step 1322, during which a test is performed to determine whether a successful XDMP result or XDMP response with data has been received. If a successful XDMP result has been received, the process continues at step 1324 by dropping the event. If, on the other hand, an XDMP response with data has been received, the process branches to step 1326. At this step, the event processor compares the remote information with the local data and generates the delta values. A test is then performed at step 1328 to determine if a checkpoint has been reached. If not, the routine branches to step 1332. If, however, a checkpoint has been reached, the process continues at step 1330. At this step, the event processor generates an XDMP event message, forwards the message to the XDMP protocol driver, increments the sent count, and clears the dirty flag. At step 1332, which is reached from one of the steps 1318, 1324, 1328 or 1330 as illustrated, a test is made to determine the mode. If the mode is upload or resync, the routine branches to step 918 in FIG. 9. This is step 1334. If the mode is regular backup, the routine enters the regular backup state. This is step 1336. If the mode is recovering, the routine enters a recovery mode. This is step 1338.

Summarizing, when a given data protection command for a given data source is forwarded to a host driver, the event processor enters into the initial upload state. During this state, the event processor gathers a list of data items of the data source to be protected and creates a data list, e.g., the sorted source tree. Then, the event processor moves the data (as an upload, preferably one data element at a time) to a DMS core to create initial baseline data. In an illustrative embodiment, as has been described, the upload is a stream of granular application-aware data chunks that are attached to upload events. During this upload phase, the application does not have to be shutdown. Simultaneously, while the baseline is uploading and as the application updates the data on the host, checkpoint granular data, metadata, and data events are continuously streamed into the DMS core, in real-time. Preferably, the update events for the data that are not already uploaded are dropped so that only the update events for data already uploaded are streamed to the DMS. The DMS core receives the real time event journal stream that includes the baseline upload events and the change events. It processes these events and organizes the data to maintain their history in a persistent storage of the DMS. If DMS fails while processing an upload or an update data event, preferably a failure event is forwarded back to the host driver and entered into an event queue as a protocol specific event. The event processor then marks the target item associated with the failure "dirty" (or out-of-sync) and then performs data synchronization with the DMS on that target item.

DMS provides significant advantages over the prior art. Unlike a conventional data protection system the data protection service provided by DMS is automated, real-time, and continuous, and it exhibits no or substantially no downtime. This is because DMS is keeping track of the real-time data history, and because preferably the state of the most current data in a DMS region, cluster or node (as the case may be) must match the state of the data in the original host server at all times. In contrast, data recovery on a conventional data protection system means shutting down a host server, selecting a version of the data history, copying the data history back to the host server, and then turning on the host server. All of these steps are manually driven. After a period of time, the conventional data protection system then performs a backup on the changed data. In the present invention, as has been described above, the otherwise separate processes (initial data upload, continuous backup, blackout and data resynchronization, and recovery) are simply phases of the overall data protection cycle. This is highly advantageous, and it is enabled because DMS keeps a continuous data history. Stated another way, there is no gap in the data. The data protection cycle described above preferably loops around indefinitely until, for example, a user terminates the service. A given data protection phase (the state) changes as the state of the data and the environment change (the incident). Preferably, as has been described, all of the phases (states) are interconnected to form a finite state machine that provides the data protection service.

The data protection service provided by the DMS has no effective downtime because the data upload, data resynchronization, data recovery and data backup are simply integrated phases of a data protection cycle. There is no application downtime.

The present invention has numerous advantages over the prior art such as tape backup, disk backup, volume replication, storage snapshots, application replication, remote replication, and manual recovery. Indeed, existing fragmented approaches are complex, resource inefficient, expensive to operate, and often unreliable. From an architectural standpoint, they are not well suited to scaling to support heterogeneous, enterprise-wide data management. The present invention overcomes these and other problems of the prior art by providing real-time data management services. As has been described, the invention transparently and efficiently captures the real-time continuous history of all or substantially all transactions and data changes in the enterprise. The solution operates over local and wide area IP networks to form a coherent data management, protection and recovery infrastructure. It eliminates data loss, reduces downtime, and ensures application consistent recovery to any point in time.

These and other advantages are provided through the use of an application aware I/O driver that captures and outputs a continuous data stream—in the form of an event journal—to other data management nodes in the system.

As one of ordinary skill in the art will appreciate, the present invention addresses enterprise data protection and data management problems by continuously protecting all data changes and transactions in real time across local and wide area networks. Preferably, and as illustrated in FIG. 1, the method and system of the invention take advantage of inexpensive, commodity processors to efficiently parallel process and route application-aware data changes between applications and low cost near storage.

While the present invention has been described in the context of a method or process, the present invention also relates to apparatus for performing the operations herein. In an illustrated embodiment, the apparatus is implemented as a processor and associated program code that implements a finite state machine with a plurality of states and to effect transitions between the states. As described above, this apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including optical disks, CD-ROMs, and magnetic-optical disks, read-only memories (ROMs), random access memories (RAMs), magnetic or optical cards, or any type of media suitable for storing electronic instructions, and each coupled to a computer system bus.

While the above written description also describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the present invention has been described in the context of an "upload" between a local data store and a remote data store, this nomenclature should not be construed as limiting. Generalizing, the present invention involves monitoring events (e.g., as a given application interfaces to a local data store in a first processing environment), and then transferring to a second data store (remote from the first processing environment) a continuous, application-aware data stream while maintaining execution of the given application in the first processing environment. This enables the transfer of a baseline version. In addition, as the application-aware data stream is being transferred (e.g., by uploading), one or more application update events can be processed into the data stream.

Having described my invention, what I now claim is as follows:

1. A method of providing a data service, comprising:
    ordering into a given data structure a set of data items associated with a given application executing in a first processing environment;
    setting a pointer at an initial position with respect to the given data structure and flagging the set of data items for a data transfer;
    monitoring events as the given application interfaces to a local data store and collecting a set of events; and
    for a given event, wherein the given event is a given type of event, processing the given event against the given data structure by the following sub-steps:

locating a data item at a then-current position of the pointer;

determining whether the data item is flagged for data transfer;

if the data item is flagged for upload, retrieving given information from the given data structure;

forwarding the given information for inclusion in an application-aware data stream;

unflagging the data item for data transfer; and resetting the pointer to a next data item in the given data structure.

2. A method of providing a data service, comprising:

ordering into a given data structure a set of data items associated with a given application executing in a first processing environment;

setting a pointer at an initial position with respect to the given data structure and flagging the set of data items for a data transfer;

monitoring events as the given application interfaces to a local data store and collecting a set of events; and for a given event, wherein the given event is a given type of event, processing the given event against the given data structure by the following sub-steps:

locating a given data item in the given data structure;

determining whether the given data item is positioned above a then-current position of the pointer;

if the given data item is not positioned above the then-current position of the pointer, placing given information in the given data structure; and dropping the event.

3. The method as described in claim 2 wherein if the given data item is positioned above the then-current position of the pointer, further including the step of:

transferring data associated with the given data item to a remote data store without additional processing.

4. A system for protecting a data source associated with a host in a first processing environment, comprising:

a processor;

a sorted source tree having a set of data items associated with the data source, the sorted source tree having a pointer associated therewith;

code executable in the processor for flagging the set of data items for a data transfer;

code executable in the processor for monitoring and capturing real-time events as the data source interfaces to a local data store in the first processing environment; and code executable in the processor for processing the set of data items in the sorted source tree as follows:

(a) determining if a real-time event is then being captured;

(b) if a real-time event is not then being captured, locating a data item in the sorted source tree based on a position of the pointer, placing the data item into an application-aware data stream, unflagging the data item, and positioning the pointer at a next position in the sorted source tree; and (c) if a real-time event is then being captured, locating an associated data item in the sorted source tree based on the position of the pointer, and determining if the associated data item is unflagged, wherein:

(i) if the associated data item is unflagged, processing the real-time event and inserting information associated with such processing into the application-aware data stream; and (ii) if the associated data item is not flagged, dropping the real-time event.

5. The system as described in claim 4 further including code executable in the processor for transferring the application-aware data stream from the first processing environment to a second processing environment.

6. The system as described in claim 4 wherein a given data item in the set of data items is associated with data that is being modified by the data source.

7. A method of providing a data service, comprising:

ordering into a data structure a set of data items associated with an application executing in a first processing environment, the data structure having a pointer associated therewith;

flagging the set of data items for a data transfer;

monitoring and capturing real-time events as the application interfaces to a local data store in the first processing environment; and processing the set of data items in the data structure as follows:

(a) determining if a real-time event is then being captured;

(b) if a real-time event is not then being captured, locating a data item in the data structure based on a position of the pointer, placing the data item into an application-aware data stream, unflagging the data item, and positioning the pointer at a next position in the data structure; and (c) if a real-time event is then being captured, locating an associated data item in the data structure based on the position of the pointer, and determining if the associated data item is unflagged, wherein:

(i) if the associated data item is unflagged, processing the real-time event and inserting information associated with such processing into the application-aware data stream; and (ii) if the associated data item is not flagged, dropping the real-time event.

8. The method as described in claim 7 further including transferring the application-aware data stream from the first processing environment to a second processing environment.

9. The method as described in claim 8 wherein the second processing environment is remote from the first processing environment.

10. The method as described in claim 7 wherein a given data item in the set of data items is associated with data that is being modified by the application.

11. The method as described in claim 7 wherein the data structure is a sorted source tree.

12. The method as described in claim 7 wherein the application-aware data stream is a baseline that is generated when the data service is initiated for the application.

13. The method as described in claim 7 wherein the real-time event is a given failure event that occurs upon a given occurrence.

14. The method as described in claim 13 further including the step of taking a given action with respect to a given data item in the set of data items upon the given occurrence.

15. The method as described in claim 14 wherein the given action is a synchronization operation with respect to a second data store distinct from the local data store.

* * * * *